US012017545B2

(12) United States Patent
Gopalakrishnan et al.

(10) Patent No.: US 12,017,545 B2
(45) Date of Patent: Jun. 25, 2024

(54) METHOD OF USING ELECTRICAL CENTER FOR BATTERY DISCONNECT

(71) Applicant: GM Global Technology Operations LLC, Detroit, MI (US)

(72) Inventors: Suresh Gopalakrishnan, Troy, MI (US); Chandra S. Namuduri, Troy, MI (US); Lyall Kenneth Winger, Waterloo (CA); James M. Morrison, Sebringville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 117 days.

(21) Appl. No.: 17/736,701

(22) Filed: May 4, 2022

(65) Prior Publication Data

US 2023/0356597 A1    Nov. 9, 2023

(51) Int. Cl.
*B60L 3/04* (2006.01)
*B60L 58/12* (2019.01)
*H02J 7/00* (2006.01)

(52) U.S. Cl.
CPC ............... *B60L 3/04* (2013.01); *B60L 58/12* (2019.02); *H02J 7/0031* (2013.01); *H02J 7/0048* (2020.01)

(58) Field of Classification Search
CPC . B60L 3/04; B60L 58/12; H02J 7/0048; H02J 7/0031
See application file for complete search history.

(56) References Cited

U.S. PATENT DOCUMENTS

| | | | |
|---|---|---|---|
| 11,130,422 B1* | 9/2021 | Goldfarb | B63B 79/15 |
| 2003/0210014 A1* | 11/2003 | Jabaji | H02J 7/007182 |
| | | | 320/104 |
| 2020/0180531 A1* | 6/2020 | Han | B60R 16/033 |
| 2021/0039520 A1* | 2/2021 | Jin | H02J 7/00308 |

* cited by examiner

*Primary Examiner* — Jared Fureman
*Assistant Examiner* — Duc M Pham
(74) *Attorney, Agent, or Firm* — CANTOR COLBURN LLP

(57) ABSTRACT

A vehicle, system, and method of providing electrical power to a vehicle. The electrical system includes a variable power source, a constant power source, a bus line connecting the variable power source to an electrical load of the vehicle, a switch between the bus line and the constant power source, and a processor. The processor is configured to monitor a voltage being supplied to the electrical load by the variable power source and to operate a fuse controller to close the switch between the bus line and the constant power source when the voltage being supplied to the electrical load drops below a first voltage threshold.

20 Claims, 5 Drawing Sheets

METHOD OF USING ELECTRICAL CENTER FOR BATTERY DISCONNECT

INTRODUCTION

The subject disclosure relates to electrical power systems in an electrical vehicle and, in particular, to a system and method for providing continuous power to an electrical load of the vehicle.

An automotive vehicle includes many devices that operate using electrical power from a power source carried by the vehicle. The power supply is generally operated to provide enough power to the devices without being wasteful of energy. However, transient spikes in electrical load can exceed what is provided by the power source. Accordingly, it is desirable to provide a system that can adjust power provided from a power supply in order to handle these transient spikes.

SUMMARY

In one exemplary embodiment, a method of providing electrical power to a vehicle is disclosed. A voltage being supplied to an electrical load by a variable power source is monitored at a processor. A fuse controller connects a constant power source to the electrical load when the voltage being supplied to the electrical load drops below a first voltage threshold.

In addition to one or more of the features described herein, the method further includes disconnecting the constant power source from the electrical load when the voltage supplied to the electrical load increases above a second voltage threshold. The method further includes adjusting a power level of the variable power source while the constant power source is connected to the electrical load. Connecting the constant power source to the electrical load further includes closing a switch between the constant power source and the electrical load. The method further includes disabling an ability of the fuse controller to close the switch when the switch is open due to a short circuit. The switch is internal to one of a smart energy center, a control circuit between the constant power source and the electrical load, and the constant power source. The method further includes monitoring a state of charge of the constant power source and adjusting the variable power source to a voltage level of the constant power source when the state of charge of the constant power source falls below a minimum state of charge threshold.

In another exemplary embodiment, an electrical system for a vehicle is disclosed. The electrical system includes a variable power source, a constant power source, a bus line connecting the variable power source to an electrical load of the vehicle, a switch between the bus line and the constant power source, and a processor. The processor is configured to monitor a voltage being supplied to the electrical load by the variable power source and close the switch between the bus line and the constant power source when the voltage being supplied to the electrical load drops below a first voltage threshold.

In addition to one or more of the features described herein, the processor is further configured to open the switch when the voltage supplied to the electrical load increases above a second voltage threshold. The processor is further configured to adjust a power level of the variable power source while the constant power source is connected to the electrical load. The processor is further configured to close the switch to connect the constant power source to the electrical load and to open the switch to disconnect the constant power source from the switch from the electrical load. A fuse controller controls operation of the switch and the processor is further configured to disable an ability of the fuse controller to close the switch when the switch is open due to a short circuit. The switch is internal to one of a smart energy center that includes the bus line, a control circuit between the constant power source and the electrical load, and the constant power source. The processor is further configured to monitor a state of charge of the constant power source and adjust the variable power source to a voltage level of the constant power source when the state of charge of the constant power source falls below a minimum state of charge threshold.

In yet another exemplary embodiment, a vehicle is disclosed. The vehicle includes a variable power source, a constant power source, a bus line connecting the variable power source to an electrical load of the vehicle, a switch between the bus line and the constant power source, and a processor. The processor is configured to monitor a voltage being supplied to the electrical load by the variable power source and close the switch between the bus line and the constant power source when the voltage being supplied to the electrical load drops below a first voltage threshold.

In addition to one or more of the features described herein, the processor is further configured to open the switch when the voltage supplied to the electrical load increases above a second voltage threshold. The processor is further configured to adjust a power level of the variable power source while the constant power source is connected to the electrical load. The processor is further configured to close the switch to connect the constant power source to the electrical load and to open the switch to disconnect the constant power source from the switch from the electrical load. A fuse controller controls operation of the switch and the processor is further configured to disable an ability of the fuse controller to close the switch when the switch is open due to a short circuit. The processor is further configured to monitor a state of charge of the constant power source and adjust the variable power source to a voltage level of the constant power source when the state of charge of the constant power source falls below a minimum state of charge threshold.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
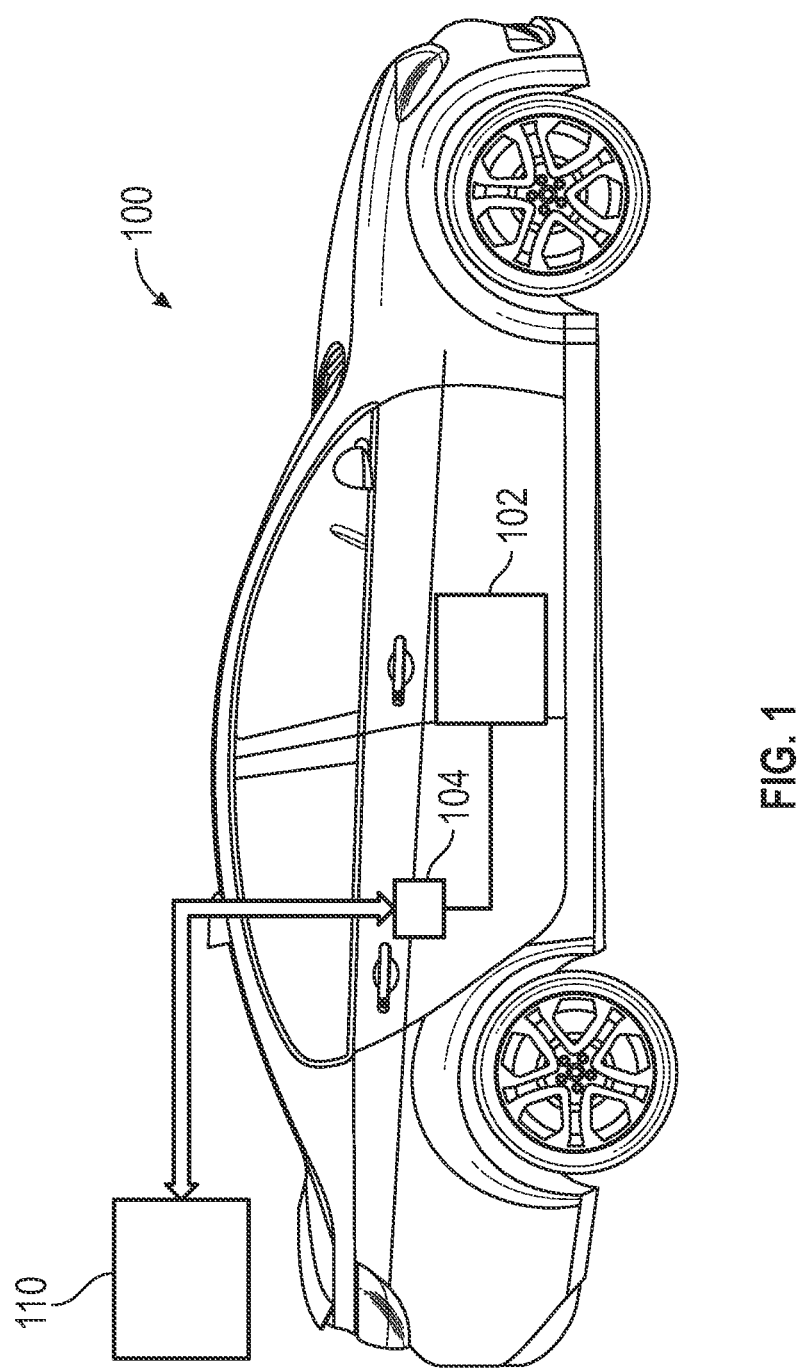
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 generally includes an electrical system 102 and a communication system 104. The electrical system 102 includes components for controlling various electrical operations of the vehicle, such as a starter motor, a generator, power windows, electrical communications, entertainment systems, etc. The remote server 110 communicates software updates and updated conditions, such as voltage thresholds, to the electrical system 102 via the communication system 104. The remote server 110 can be a manufacturer's server, for example. The configuration and operation of the electrical system 102 can thus be changed according to instructions received from the remote server 110.

Figure 2:
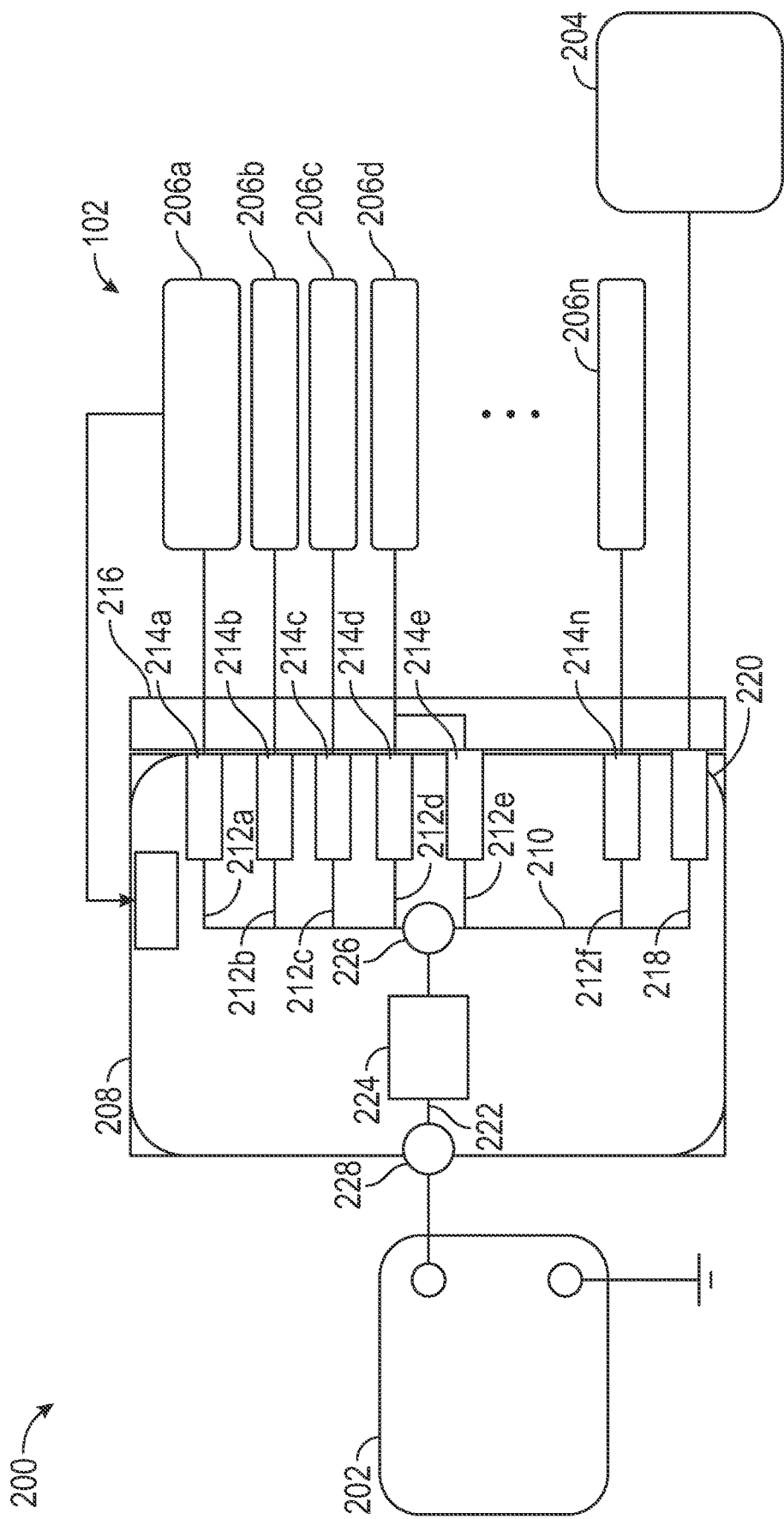
FIG. 2 shows a schematic diagram of an electrical system of the vehicle.

FIG. 2 shows a schematic diagram 200 of the electrical system 102 of the vehicle 100. The electrical system 102 includes a constant power source 202, a variable power source 204, a plurality of electrical loads 206a-206n and a smart energy center (SEC) 208. The SEC 208 can include a processor for performing various operations. The constant power source 202 can be a battery. The variable power source 204 is a power source whose voltage and current output can be adjusted during operation of the vehicle 100. In various embodiments, the variable power source 204 is a high voltage auxiliary power module (HV APM) or a generator. The electrical loads 206a-206n can be electrical control units for various electrical components of the vehicle, such as the starter motor, the generator, power windows, electrical communications, entertainment systems, etc. The smart energy center 208 is an energy control circuit that controls the connection between the constant power source 202, the variable power source 204 and the electrical loads 206a-206n.

The smart energy center 208 includes a bus line 210 over which power is provided. The bus line 210 includes a plurality of branches 212a-212n connecting the bus line 210 to the electrical loads 206a-206n, respectively. Each of the plurality of branches 212a-212n includes a respective electronic fuse or eFuse 214a-214n. The eFuse is a solid-state fuse that can be programmed to activate (blow) at a given threshold voltage. The threshold voltage can be reprogrammed as desired to accommodate differences in the electrical requirements along a branch as one electrical load is removed and replaced by another.

A connector 216 can be used to define a relation between the plurality of branches 212a-212n and the plurality of electrical loads 206a-206n. In general, the connector 216 can connect a single branch (e.g., branch 212a) and its related eFuse (e.g., eFuse 214a) to a single electrical load (e.g., electrical load 206a). Alternatively, the connector can connect two or more branches (e.g., branch 212d and branch 212e) and their eFuses (e.g., eFuse 214d and eFuse 214e) to a single electrical load (e.g., electrical load 206d).

A variable power branch 218 connects the bus line 210 to the variable power source 204 and includes an eFuse 220. A constant power branch 222 connects the bus line 210 to the constant power source 202. The constant power branch 222 includes a switch 224 for coupling and/or decoupling the constant power source 202 to the bus line 210. A system node 226 is shown to indicate a system voltage $V_s$ of the smart energy center 208. A battery node 228 is shown to indicate a battery voltage $V_b$.

In a first mode of operation, the variable power source 204 supplies power to the electrical loads 206a-206n via the bus line 210. The power supplied by the variable power source 204 can be reduced to a suitable power value which provides sufficient power to the electrical loads 206a-206n. When one or more electrical loads experience a transient spike which causes its voltage requirement to increase above what is supplied by the variable power source 204, the switch 224 can be flipped to connect the constant power source 202 to the smart energy center 208, thereby providing a sufficient power to the electrical loads 206a-206n.

When the electrical load requirements increase at an electrical load during a spike, it has the effect of reducing the voltage level along the bus line 210 of the smart energy center 208 (i.e., the system voltage $V_s$). When the transient spike goes away, the system voltage $V_s$ increases.

Figure 3:
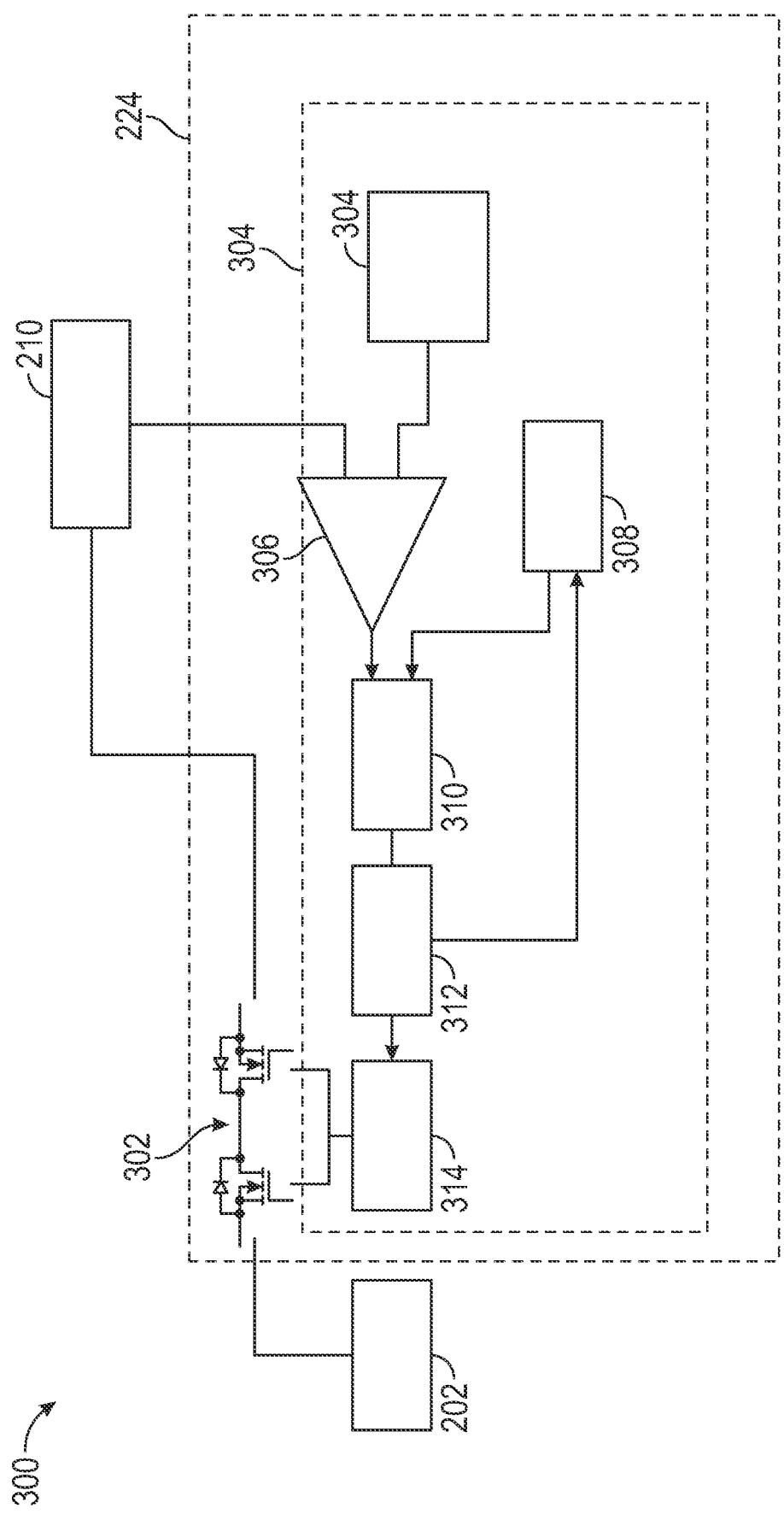
FIG. 3 shows schematic diagram of a switch connecting a constant power source of the electrical system to a bus line of a smart energy center.

FIG. 3 shows schematic diagram 300 of the switch 224 connecting the constant power source 202 to the bus line 210. The switch 224 includes a switching element 302 and a switch controller 304 (battery line controller). The switching element 302 includes a pair of FETs located along the constant power branch 222 which can be switched between an enabled state and a disabled stated in order to connect or disconnect the constant power source 202 to the bus line 210. The switch controller 304 includes a comparator 306, a microcontroller 308, a logic circuit 310 (e.g., an AND circuit), an eFuse controller 312 and a gate driver 314. The system voltage ($V_s$) is provided as a first input to the comparator 306. A minimum system voltage threshold ($V_{th}$) 316 is provided as a second input to the comparator 306. The minimum system voltage threshold $V_{th}$ 316 is a pre-determined threshold value which can be dynamically controlled and calibrated. The comparator 306 compares the system voltage $V_s$ to the minimum system voltage threshold $V_{th}$ 316. The comparator outputs an ENABLE signal when the system voltage falls below the minimum system voltage threshold ($V_s < V_{th}$), and outputs a DISABLE signal when the system voltage rises above the minimum system voltage threshold ($V_s > V_{th}$).

In various embodiments, the minimum system voltage threshold ($V_{th}$) 316 can include a first threshold voltage and a second threshold voltage. The first threshold voltage is less than the second threshold voltage. When the system voltage falls below the first threshold voltage, the comparator 306 outputs an ENABLE signal and when the system voltage rises above the second threshold voltage, the comparator outputs a DISABLE signal.

The output from the comparator 306 is a first input into the logic circuit 310. The microcontroller 308 provides a lock-out control signal as a second input into the logic circuit 310. The lock-out control signal is either an ENABLE signal or a DISABLE signal. The output (ENABLE, DISABLE) of the logic circuit 310 is provided to the eFuse controller 312.

The eFuse controller 312 monitors the operation of the switching element 302, including parameters such as its temperature, current flowing through it, etc. Without an external signal, such as provided from the logic circuit 310, the eFuse controller 312 controls the operation or state of the switching element 302. The eFuse controller 312 sends a control signal to the gate driver 314, which either closes or engages the switching element 302 (i.e. connects the constant power source 202 to the bus line 210) or opens or disengages the switching element (i.e., disconnects the constant power source 202 from the bus line 210) based on the signal.

The eFuse controller 312 sends a feedback signal to the microcontroller 308 based on the state of the eFuse controller 312 (i.e., activated or not activated). If the feedback signal indicates that the switching element 302 element is open due to a short circuit, the eFuse controller 312 maintains the gate driver 314 in an OFF state (i.e., battery disconnected) regardless of input to the eFuse controller. Assuming the switching element 302 is open due to a command signal, if an ENABLE signal is received from the microcontroller 308 and the comparator 306 provides a DISABLE signal ($V_s > V_{min}$), the eFuse controller 312 does not send a command to the gate driver 314 to close the switching element 302 (i.e., the switching element remains open). Assuming the switching element 302 is open due to a command signal, if both the microcontroller provides an ENABLE signal and the comparator 306 provides an ENABLE signal ($V_s < V_{min}$), the eFuse controller 312 will send a command to the gate driver 314 to close the switching element 302.

Figure 4:
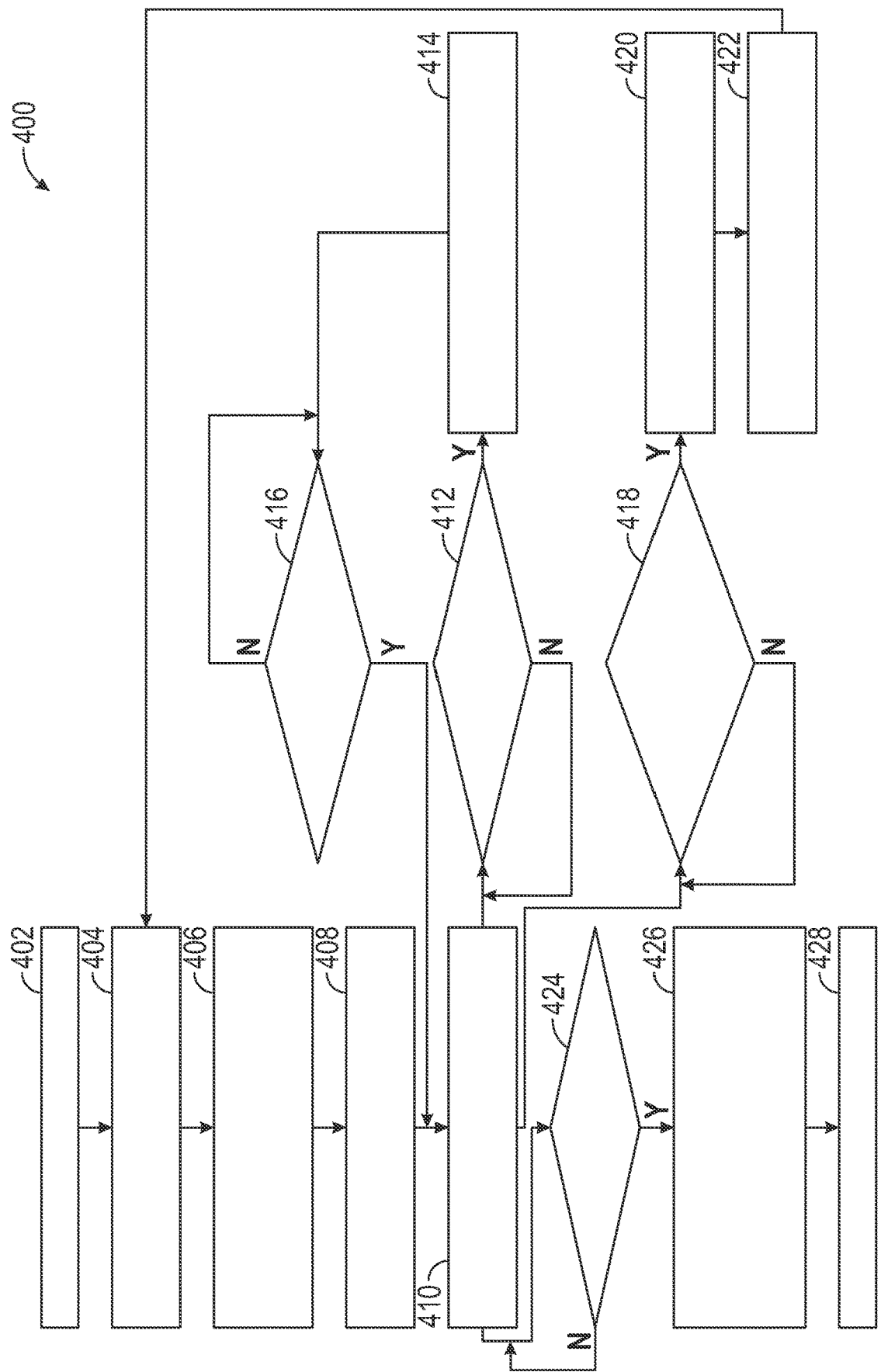
FIG. 4 shows a flowchart illustrating a method for controlling the operation of the smart energy center.

FIG. 4 shows a flowchart 400 illustrating a method for controlling the operation of the SEC 208. The method begins at box 402 with the vehicle in an ON state. In box 404, the charge or state of charge (SOC) of the constant power source 202 is measured to determine that it is above a target threshold. In box 406, the minimum voltage threshold is set and the constant power source 202 is disconnected from the SEC. In box 408, the relay control signal of the microcontroller is set to OFF. In box 410, the voltage level of the variable power source is reduced to a value that is suitable to run the electrical loads 206a-206n at a fuel economy level (i.e., without providing power that is not needed and is therefore wasted). Various possible changes in condition can occur. If the condition however does not change, the method remains at box 410.

In box 410, the system voltage $V_s$ is reduced to a suitable level at which power is supplied for all of the electrical loads. This suitable level can be a fuel economy level at which the system voltage $V_s$ is above a maximum power requirement by a selected amount so as to provide adequate power during normal operation without providing too much power that is eventually wasted.

Boxes 412, 418 and 424 monitor the SEC 208 and are used to perform various functions at the SEC when various conditions occurs. Box 412 monitors the system voltage with respect to a voltage threshold value $V_{min}$. While the system voltage is above the threshold value, the method remain in box 412 for continuous monitoring. If the system voltage drops below $V_{min}$, then method proceeds to box 414. In box 414, if the battery fuse is activated, then the switch 224 is closed to connect the constant power source 202 to the SEC 208 or bus line 210. It is to be noted however that if the battery fuse is OPEN due to a blow event at the switch 224, the switch 224 will remain open. In box 416, the system voltage is again monitored with respect to the voltage threshold value $V_{min}$. While the system voltage $V_s$ is above the below $V_{min}$, the method remains in box 416 for continuous monitoring. If the system voltage increases above $V_{min}$, the method proceeds to box 410. The $V_{min}$ of box 412 can be a first value (i.e., $V_{min1}$) while the $V_{min}$ of box 416 can be a second value (i.e., $V_{min2}$), with $V_{min1} < V_{min2}$.

Box 418 monitors the state of charge (SOC) on the constant power source 202. While the battery SOC is above a minimum SOC value, the method remains in box 418 for continuous monitoring. When the SOC drops below the minimum SOC value, the method proceeds to box 420. In box 420, the voltage level of the variable power source 204 is raised to the voltage level of the battery voltage $V_b$. In box 422, if the battery fuse is activated, then the switch 224 is closed. The method then proceeds to box 404.

Box 424 monitors whether there is a request to turn off the vehicle. If there is no request, the method remains in box 424 for continuous monitoring. If there is a request to turn off the vehicle, the method proceeds to box 426. In box 426, the microcontroller relay control signal is set to ON, the low voltage switch control is disabled and the switch 224 is closed to connect the constant power source 202 to the SEC 208. In box 428, the vehicle is turned off.

Figure 5:
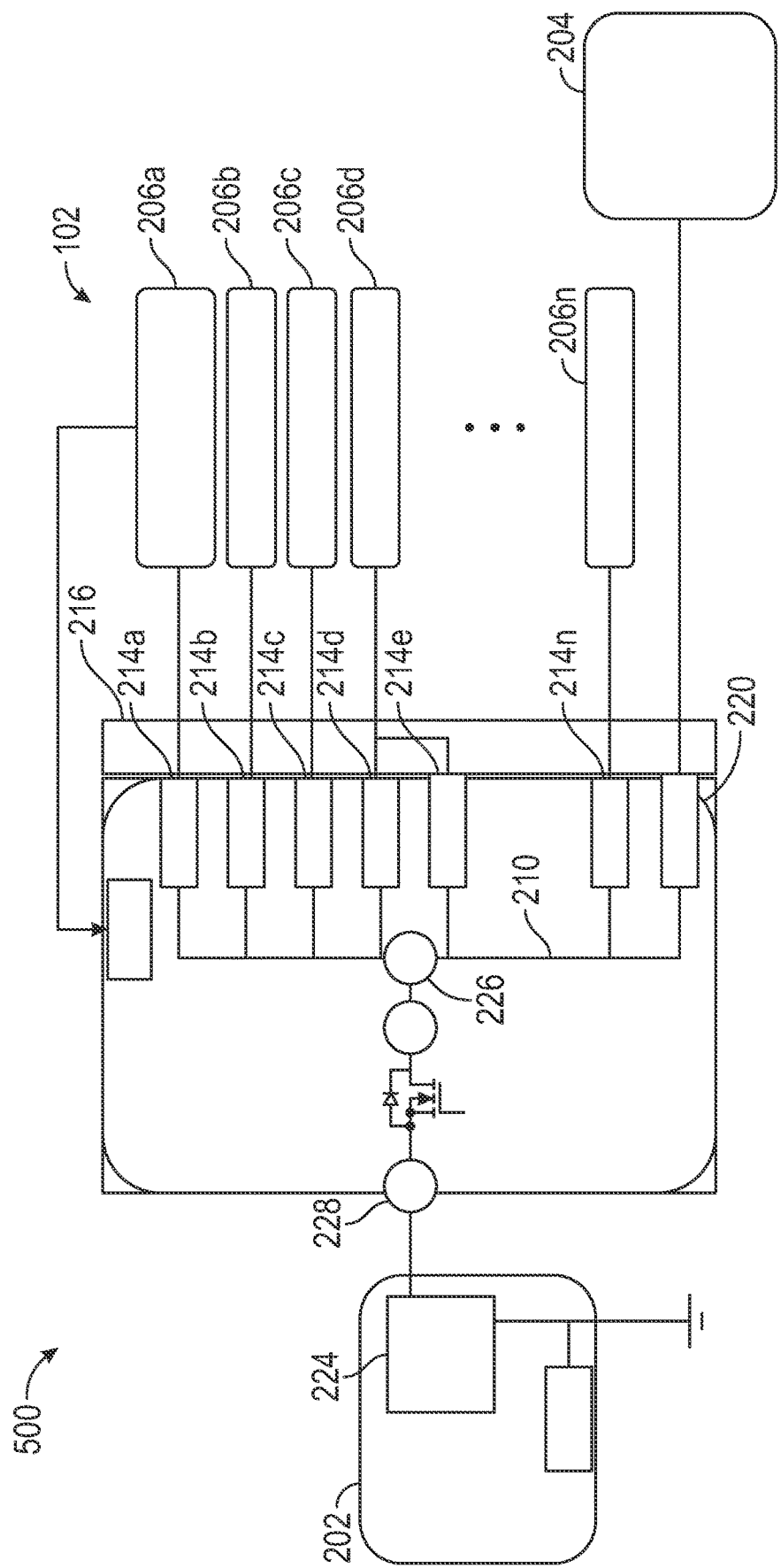
FIG. 5 shows a schematic diagram of the electrical system of the vehicle in an alternative embodiment.

FIG. 5 shows a schematic diagram 500 of the electrical system 102 of the vehicle 100 in an alternative embodiment. The switch 224 is located in the constant power source 202 rather than on the constant power branch 222.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of providing electrical power to a vehicle, comprising:
   monitoring, at a first processor, a voltage being supplied to an electrical load by a variable power source;
   providing the voltage to a switch, the switch including a comparator, a logic circuit, a second processor, a fuse controller, and a switching element between the electrical load and a constant power source;
   outputting a comparator signal from the comparator to the logic circuit, the comparator signal indicative of a comparison of the voltage to a first voltage threshold;
   providing a lockout control signal from the second processor to the logic circuit;
   outputting a control signal from the logic circuit to the fuse controller based on the comparator signal indicating the voltage being less than the first voltage threshold and the lockout control signal being enabled; and
   closing, via the fuse controller, the switching element to connect the constant power source to the electrical load based on the control signal from the logic circuit, wherein the fuse controller maintains the switching element in an open position regardless of the control signal when the switching element is opened due to a short circuit.

2. The method of claim 1, further comprising disconnecting the constant power source from the electrical load when the voltage supplied to the electrical load increases above a second voltage threshold greater than the first voltage threshold.

3. The method of claim 1, further comprising adjusting a power level of the variable power source while the constant power source is connected to the electrical load.

4. The method of claim 1, wherein the switch is internal to one of: (i) a smart energy center; (ii) a control circuit between the constant power source and the electrical load; and (iii) the constant power source.

5. The method of claim 1, further comprising monitoring a state of charge of the constant power source and adjusting the variable power source to a voltage level of the constant power source when the state of charge of the constant power source falls below a minimum state of charge threshold.

6. The method of claim 1, wherein the switching element includes a field effect transistor.

7. The method of claim 1, wherein the voltage is reduced to less than the first voltage threshold due to a transient spike in a voltage requirement at the electric load.

8. An electrical system for a vehicle, comprising:
a variable power source;
a constant power source;
a bus line connecting the variable power source to an electrical load of the vehicle, wherein the variable power source supplies a voltage to the electrical load via the bus line; and
a switch between the bus line and the constant power source, the switch including a comparator, a logic circuit, a processor, a fuse controller, and a switching element between the electrical load and the constant power source;
wherein the comparator is configured to output a comparator signal to the logic circuit, the comparator signal indicative of a comparison of the voltage to a first voltage threshold,
the processor is configured to provide a lockout control signal from the processor to the logic circuit,
the logic circuit is configured to output a control signal to the fuse controller based on the comparator signal indicating the voltage being less than the first voltage threshold and the lockout control signal being enabled, and
the fuse controller is configured to close the switching element to connect the constant power source to the electrical load based on the control signal from the logic circuit and maintain the switching element in an open position regardless of the control signal when the switching element is opened due to a short circuit.

9. The electrical system of claim 8, wherein the processor is further configured to open the switch when the voltage supplied to the electrical load increases above a second voltage threshold greater than the first voltage threshold.

10. The electrical system of claim 8, wherein the processor is further configured to adjust a power level of the variable power source while the constant power source is connected to the electrical load.

11. The electrical system of claim 8, wherein the switch is internal to one of: (i) a smart energy center that includes the bus line; (ii) a control circuit between the constant power source and the electrical load; and (iii) the constant power source.

12. The electrical system of claim 8, wherein the processor is further configured to monitor a state of charge of the constant power source and adjust the variable power source to a voltage level of the constant power source when the state of charge of the constant power source falls below a minimum state of charge threshold.

13. The electrical system of claim 8, wherein the switching element includes a field effect transistor.

14. The electrical system of claim 8, wherein the voltage is reduced to less than the first voltage threshold due to a transient spike in a voltage requirement at the electric load.

15. A vehicle, comprising:
a variable power source;
a constant power source;
a bus line connecting the variable power source to an electrical load of the vehicle, wherein the variable power source supplies a voltage to the electrical load via the bus line; and
a switch between the bus line and the constant power source, the switch including a comparator, a logic circuit, a processor, a fuse controller, and a switching element between the electrical load and the constant power source;
wherein the comparator is configured to output a comparator signal to the logic circuit, the comparator signal indicative of a comparison of the voltage to a first voltage threshold,
the processor is configured to provide a lockout control signal from the processor to the logic circuit,
the logic circuit is configured to output a control signal to the fuse controller based on the comparator signal indicating the voltage being less than the first voltage threshold and the lockout control signal being enabled, and
the fuse controller is configured to close the switching element to connect the constant power source to the electrical load based on the control signal from the logic circuit and maintain the switching element in an open position regardless of the control signal when the switching element is opened due to a short circuit.

16. The vehicle of claim 15, wherein the processor is further configured to open the switch when the voltage supplied to the electrical load increases above a second voltage threshold greater than the first voltage threshold.

17. The vehicle of claim 15, wherein the processor is further configured to adjust a power level of the variable power source while the constant power source is connected to the electrical load.

18. The vehicle of claim 15, wherein the processor is further configured to monitor a state of charge of the constant power source and adjust the variable power source to a voltage level of the constant power source when the state of charge of the constant power source falls below a minimum state of charge threshold.

19. The vehicle of claim 15, wherein the switching element includes a field effect transistor.

20. The vehicle of claim 15, wherein the voltage is reduced to less than the first voltage threshold due to a transient spike in a voltage requirement at the electric load.

* * * * *